United States Patent
Koch et al.

(10) Patent No.: US 9,406,934 B2
(45) Date of Patent: Aug. 2, 2016

(54) RECHARGEABLE BATTERY CELL WITH IMPROVED HIGH TEMPERATURE PERFORMANCE

(75) Inventors: John M. Koch, Brighton, MI (US); Cristian Fierro, Northville, MI (US)

(73) Assignee: BASF Corporation, Rochester Hills, MI (US)

( * ) Notice: Subject to any disclaimer, the term of this patent is extended or adjusted under 35 U.S.C. 154(b) by 703 days.

(21) Appl. No.: 13/367,917

(22) Filed: Feb. 7, 2012

(65) Prior Publication Data

US 2013/0202965 A1 Aug. 8, 2013

(51) Int. Cl.
| | |
|---|---|
| H01M 4/32 | (2006.01) |
| H01M 4/52 | (2010.01) |
| H01M 4/131 | (2010.01) |
| H01M 4/80 | (2006.01) |
| H01M 4/134 | (2010.01) |
| H01M 4/24 | (2006.01) |
| H01M 10/24 | (2006.01) |
| H01M 10/34 | (2006.01) |

(52) U.S. Cl.
CPC .............. *H01M 4/52* (2013.01); *H01M 4/131* (2013.01); *H01M 4/32* (2013.01); *H01M 4/808* (2013.01); *H01M 4/134* (2013.01); *H01M 4/242* (2013.01); *H01M 10/24* (2013.01); *H01M 10/345* (2013.01); *Y02E 60/124* (2013.01)

(58) Field of Classification Search
CPC ..... H01M 4/131; H01M 4/134; H01M 4/242; H01M 4/32
USPC ........................................................ 429/223
See application file for complete search history.

(56) References Cited

U.S. PATENT DOCUMENTS

| | | | |
|---|---|---|---|
| 4,623,597 | A | 11/1986 | Sapru et al. |
| 5,096,667 | A | 3/1992 | Fetcenko |
| 5,104,617 | A | 4/1992 | Fetcenko et al. |
| 5,238,756 | A | 8/1993 | Fetcenko et al. |
| 5,277,999 | A | 1/1994 | Ovshinsky et al. |
| RE34,752 | E | 10/1994 | Oshitani et al. |

(Continued)

FOREIGN PATENT DOCUMENTS

| | | |
|---|---|---|
| EP | 1164650 A2 | 12/2001 |
| JP | 2001357845 A | 12/2001 |

OTHER PUBLICATIONS

Kim et al. A Study on the Phase Transformation of Electrochemically Precipitated Nickel Hydroxides Using an Electrochemical Quartz Crystal Microbalance. J. Electrochem. Soc. vol. 145, No. 2, 1998, pp. 507-511 [online], [retrieved on Sep. 10, 2015]. Retrieved from the Internet <URL: http://jes.ecsdl.org/content/145/2/507.full.pdf+html>.*

(Continued)

*Primary Examiner* — Basia Ridley
*Assistant Examiner* — James Erwin
(74) *Attorney, Agent, or Firm* — Dinsmore & Shohl LLP

(57) ABSTRACT

An alkaline, rechargeable electrochemical cell includes a pasted electrode structure in which a composition comprising a paste matrix component includes cobalt in an amount greater than 6 weight percent ranging up to 14 weight percent. The matrix may also include a rare earth such as yttrium. The composition further includes particles of nickel hydroxide dispersed in the matrix, and these particles include cobalt levels ranging from greater than 8 atomic percent up to 15 atomic percent. Cells incorporating these materials have good charging efficiency at elevated temperatures.

21 Claims, 4 Drawing Sheets

(56) References Cited

U.S. PATENT DOCUMENTS

| | | |
|---|---|---|
| 5,366,831 A | 11/1994 | Watada et al. |
| 5,407,761 A | 4/1995 | Ovshinsky et al. |
| 5,451,475 A | 9/1995 | Ohta et al. |
| 5,455,125 A | 10/1995 | Matsumoto et al. |
| 5,466,543 A | 11/1995 | Ikoma et al. |
| 5,489,314 A | 2/1996 | Bogauchi et al. |
| 5,506,070 A | 4/1996 | Mori et al. |
| 5,536,591 A | 7/1996 | Fetcenko et al. |
| 5,571,636 A | 11/1996 | Ohta et al. |
| 6,228,535 B1 | 5/2001 | Fierro et al. |
| 6,649,304 B2 | 11/2003 | Tani et al. |
| 2004/0202931 A1* | 10/2004 | Christian et al. .............. 429/223 |

OTHER PUBLICATIONS

Chinese language Office Action issued in co-pending international patent application No. CN 201380008463.6, dated Dec. 31, 2015.

Korean language Office Action issued in co-pending international patent application No. KR 2014-7024114, dated Jan. 28, 2016.

\* cited by examiner

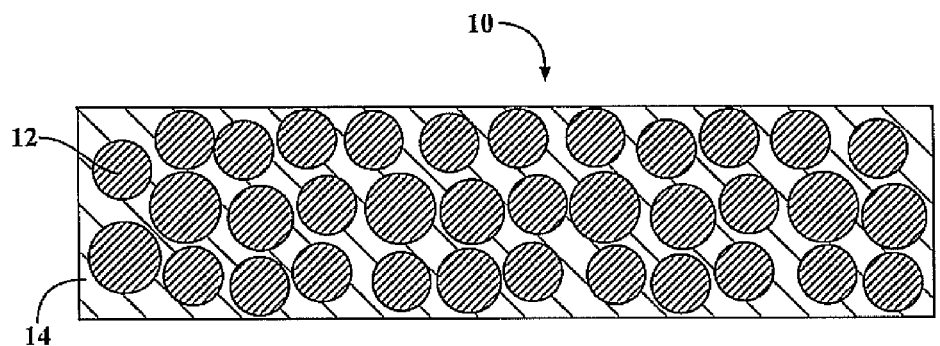
FIG. 1
FIG. 2
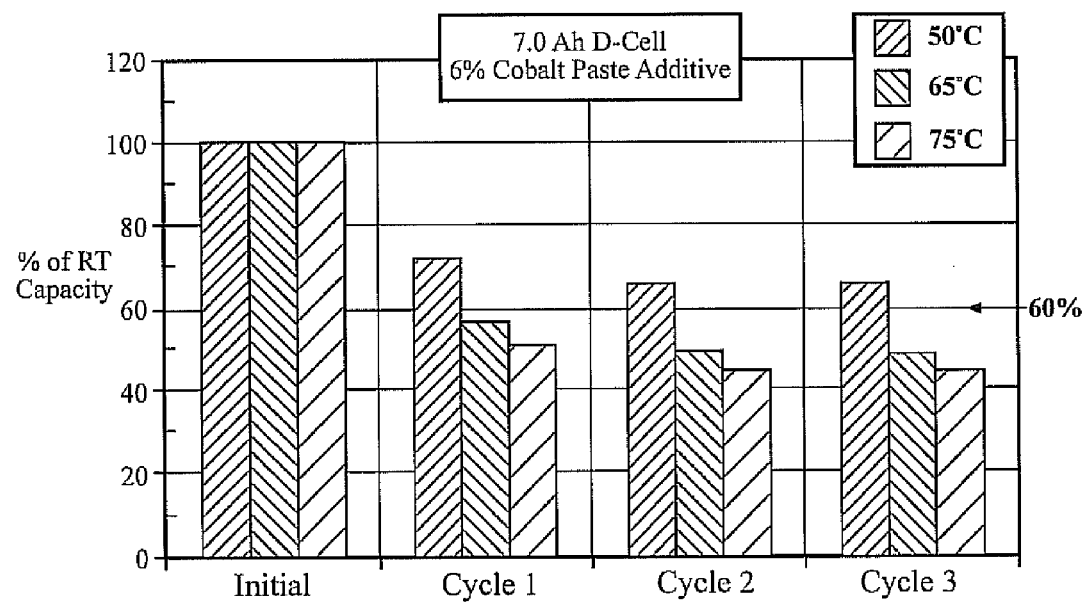

RECHARGEABLE BATTERY CELL WITH IMPROVED HIGH TEMPERATURE PERFORMANCE

FIELD OF THE INVENTION

This invention relates generally to rechargeable alkaline electrochemical cells and more particularly to rechargeable alkaline electrochemical cells having improved high temperature performance characteristics, and to methods and materials for their fabrication. Specifically, the invention relates to compositions and methods for fabrication of positive electrodes for rechargeable electrochemical cells which are optimized for high temperature operation.

BACKGROUND OF THE INVENTION

Nickel containing, rechargeable alkaline cells are presently in wide use in battery systems including nickel metal hydride batteries and the like. For purposes of this disclosure, the terms "batteries" and "cells" will be used interchangeably when referring to one electrochemical cell, although the term "battery" can also refer to a plurality of electrically interconnected cells.

While the present discussion focuses primarily on nickel metal hydride (NiMH) batteries, it should be understood that the electrode structures of the present invention can be used in other types of batteries which include nickel hydroxide based positive electrode materials. In general, NiMH cells employ a negative electrode made of a hydrogen storage alloy that is capable of the reversible electrochemical storage of hydrogen. NiMH cells also employ a positive electrode made from a nickel hydroxide active material. The negative and positive electrodes are disposed in an alkaline electrolyte and separated by a body of spacer material so as to form an electrochemical cell. Upon the application of an electrical potential across the NiMH cell, water is dissociated into one hydroxyl ion and one hydrogen ion at the surface of the negative electrode. The hydrogen ion combines with one electron and diffuses into the bulk of the hydrogen storage alloy. This reaction is reversible. Upon discharge the stored hydrogen is released to form a water molecule and release an electron.

The development of commercially viable NiMH batteries began in the 1980s with the improvement of the negative electrode materials which resulted from making them "disordered" as taught by Ovshinsky et al. in U.S. Pat. No. 4,623,597. Such negative electrode materials represented a total departure from other teachings of that period which advocated the formation of homogeneous and single phase negative electrodes. (For a more detailed discussion see U.S. Pat. Nos. 5,096,667; 5,104,617; 5,238,756; 5,277,999; 5,407,761; and 5,536,591 and the discussion contained therein. The disclosures of these patents are incorporated herein by reference.) Use of such disordered negative electrode metal hydride materials significantly increases the reversible hydrogen storage characteristics required for efficient and economical battery applications and results in the commercial production of batteries having high density energy storage, efficient reversibility, high electrical efficiency, bulk hydrogen storage without structural change or poisoning, long cycle life, and deep discharge capability.

Further improvements in the performance of NiMH batteries resulted from improvements in the nickel hydroxide material incorporated into the positive electrodes of the batteries. In that regard, modifying and/or doping elements were added to the nickel hydroxide material so as to improve their structural and/or electronic properties. Some such compensating and/or doping materials include Co, Cd, Zn, Mg, and Ca among others. Such materials are disclosed in U.S. Pat. Nos. 6,228,535; Re. 34,752; 5,366,831; 5,451,475; 5,455,125; 5,466,543; 5,489,314; 5,506,070; and 5,571,636, the disclosures of which are incorporated herein by reference.

Charge capacity is a measure of how much electrical energy a battery is capable of storing and delivering. Consequently, charge capacity is a very important characteristic of any type of battery. As is evident from the prior art, as for example the prior art disclosed herein, significant strides have been made toward improving the charge capacity of rechargeable battery systems. However, it is also recognized in the art that performance characteristics of rechargeable batteries, including charge capacity, are adversely impacted when the battery systems are run under elevated temperature conditions. For example, in conventional NiMH batteries it has been found that operation under even modestly elevated temperatures such as 55° C. can reduce the run time of a battery by 35 to 55 percent compared to room temperature operation of the same battery. It is believed that this temperature-related loss of charge capacity is at least in part the result of undesirable electrode reactions, including the generation of oxygen at the surface of the cathode. Therefore, in addition to charge capacity, charge efficiency must also be taken into consideration in evaluating the performance of a battery system. In the context of this disclosure, "charge efficiency" is understood to refer to the amount of a battery's theoretical charge capacity which can actually be accessed under particular operating conditions. In this regard a battery having a high charge efficiency at elevated temperatures will be understood to manifest a charge capacity under such conditions, which is at most only moderately reduced from its charge capacity at lower temperatures. And conversely, a battery having a low charge efficiency at elevated temperatures will show a charge capacity which is much less than its charge capacity at lower temperatures.

Given the fact that rechargeable batteries often must operate under elevated temperature conditions, it will be understood that any improvements in their high temperature charge efficiency will be of great commercial significance. As will be explained hereinbelow, the present invention is based upon the finding that the high temperature performance of rechargeable alkaline batteries can be significantly improved if cobalt levels of materials comprising the positive electrode portion of the battery are selected so as to fall within particular ranges. These and other advantages of the invention will be apparent from the drawings, discussion, and description which follow.

BRIEF DESCRIPTION OF THE INVENTION

Disclosed herein is a positive electrode composition for use in an alkaline rechargeable electrochemical cell. The composition includes a matrix material comprising a mixture of nickel hydroxide and a cobalt material comprising cobalt and/or cobalt oxide wherein the weight percent of cobalt in the matrix material relative to the nickel hydroxide component thereof is greater than 6 percent and ranges up to 14 percent. The composition further includes particles of nickel hydroxide dispersed in the matrix. These particles include cobalt in an atomic percent which is greater than 8 percent and ranges up to 15 percent.

In particular embodiments, the concentration of cobalt in the matrix ranges from 8 to 12 weight percent. In some embodiments the nickel hydroxide particles are comprised of an aggregation of a plurality of micro crystallites each having a size of less than 100 angstroms, and in some instances a size of less than 90 Angstroms, and in one particular instance, a size of 87 Angstroms based on the reflection peak from the <101> plane.

The matrix may also include a binder. The electrode composition may be incorporated into an electrode structure by supporting the composition onto a substrate which may, in some instances, comprise a foam metal such as nickel.

In certain embodiments of the invention, the matrix material of the positive electrode composition may include a rare earth metal such as yttrium either in conjunction with cobalt or as a substitute therefor.

Further disclosed herein are battery cells which include the positive electrode composition. Also disclosed herein is a method of making electrodes for rechargeable alkaline electrochemical cells, and the method involves disposing a pasted structure comprising the matrix and particles onto substrate. Pasting may be accomplished by a wet or a dry process.

BRIEF DESCRIPTION OF THE DRAWINGS

FIG. 1 is a cross-sectional view of a body of a positive electrode composition of the present invention;

FIG. 2 is a graph depicting performance characteristics of a rechargeable cell typical of the prior art;

DETAILED DESCRIPTION OF THE INVENTION

Figure 3:
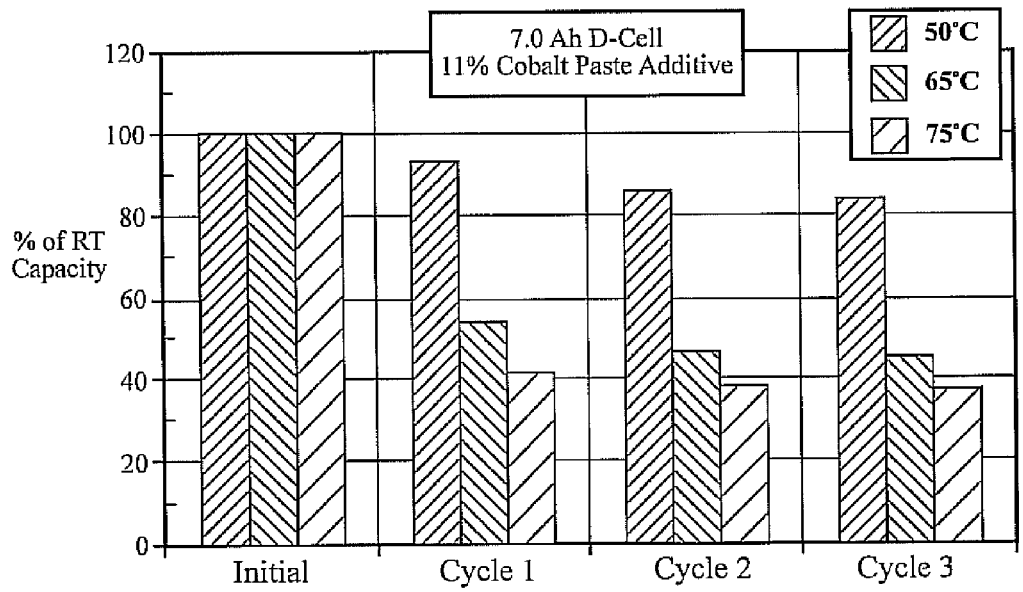
FIG. 3 is a graph depicting performance characteristics of a cell in accord with the present invention.

The present invention is based upon the finding that the high temperature performance, and in particular the high temperature charge efficiency of alkaline, rechargeable electrochemical cells such as nickel metal hydride cells and the like can be significantly improved if the cobalt concentrations in certain nickel based components of the positive electrodes of these electrochemical cells are maintained within certain specific ranges. And, in accord with a further aspect of this invention, it has been found that inclusion of rare earth metals such as yttrium, ytterbium, erbium, lanthanum, and scandium in the positive electrode composition still further enhances the high temperature charge efficiency of these cells.

Nickel hydroxide materials are used in the fabrication of electrodes for battery cells such as nickel metal hydride and lithium ion batteries. The nickel hydroxide materials incorporated in these types of cells are frequently doped and/or modified with metals and metal-like elements so as to provide optimum electrochemical performance. Some such dopants and modifiers include, but are not limited to, Al, Bi, Ca, Co, Cr, Cu, Fe, In, La, Mg, Mn, Ru, Sb, Sn, Ti, Ba, Si, Sr, Zn, and rare earth elements such as yttrium. One group of such modified nickel hydroxide materials having utility in connection with the present invention is disclosed in U.S. Pat. No. 6,228,535, the disclosure of which is incorporated herein by reference.

The electrodes of the present invention are based upon doped and/or modified nickel hydroxides as discussed above. In accord with techniques generally known in the art, the electrode structures may be fabricated utilizing a "pasted" technique wherein an active material such as the doped or modified nickel hydroxide particulate material is combined with a matrix material (which may also be electrochemically active) to form an electrode composition which is then supported in an electrode substrate, typically a metallic foam substrate.

Referring now to FIG. 1, there is shown a schematic depiction of a typical electrode composition 10 used in the fabrication of "pasted" electrodes. The composition includes a plurality of particles 12 of a nickel hydroxide material which are disposed in a matrix 14. In accord with the present invention, the particles 12 are particles of a nickel hydroxide material and may, in particular instances, be a material generally in accord with the teaching of the aforementioned U.S. Pat. No. 6,228,535.

The matrix 14 serves to bind the particles together and further operates to enhance the bulk electrical conductivity of the composition by providing relatively low resistance current paths between the particles 12. In compositions in accord with the present invention, the matrix 14 comprises relatively finely divided nickel hydroxide together with a cobalt-containing material which may be cobalt metal and/or cobalt oxide. The particle size of the nickel hydroxide component of the matrix is typically in the range of 5-20 microns, and the particle size of the cobalt component is in the range of 0.7 to 1.5 microns in the instance of metallic cobalt and is in the range of 0.7 to 3.0 microns in the instance of cobalt oxide. However, it is to be understood that other size ranges for the matrix materials may also be employed. The matrix material may further include a binder which provides structural integrity to the composition. Binders may comprise polymeric materials, and water-soluble polymers such as but not limited to polyvinyl alcohol may be employed for this purpose.

In the fabrication of an electrode structure, the aforedescribed positive electrode composition is affixed to a support substrate which is typically electrically conductive. In particular instances, the substrate may comprise a metal. In some particular applications which will be described hereinbelow, the substrate comprises a body of nickel foam. The electrode composition 10 may be applied to the substrate in either a wet or dry process. In a dry process, an intimate mixture of the particles and matrix material is applied to the substrate and then wetted with a solvent material which may comprise pure water or an aqueous binder solution. In a wet process, the water or aqueous binder material is first added to the electrode composition which is then disposed upon the substrate. In either instance, the coated substrate is then dried to produce the electrode structure. In those instances where a nickel foam substrate is employed, the coated substrate may be compressed in a calendaring step so as to reduce its thickness and compress the electrode structure. In a typical calendaring process, the thickness of the coated, nickel foam substrate is reduced by approximately 50%.

As discussed above, the prior art recognizes that the nickel hydroxide component of the electrodes may preferably be doped and/or modified with various elements, which include cobalt. Cobalt levels in the nickel hydroxide particulate materials of the prior art typically range from 1 to 5 atomic percent and in some instances up to 8 atomic percent. In the prior art, the cobalt levels of the matrix material typically range from 4 to 6 weight percent taken with regard to the weight of the nickel hydroxide component of the matrix material.

In a typical electrode composition 10 of the present invention, the nickel hydroxide particles 12 comprise generally spherical particles having an average particle diameter of 5-20 microns; although in some instances, the invention may be practiced utilizing particles of another size and/or shape. In some instances, the particles 12 comprise approximately 89 to 96 percent by weight of the material 10; however, other loadings of the particles are contemplated within the scope of the invention.

As noted above, the matrix component of the material, in addition to including cobalt, may also include other elements, which specifically include rare earth elements. In accord with a further aspect of the present invention, it has been found that incorporation of rare earths such as yttrium into the matrix 14 of a positive electrode composition 10 will enhance the high temperature charge efficiency of a battery cell incorporating this composition. The yttrium may be present as the free metal and/or as an oxide. Typical levels for the yttrium are in the range of 0.5 to 5% by weight, and in specific instances yttrium levels are in the range of 0.5% to 2% by weight. All of these levels are stated on the basis of yttrium metal. Similar results are anticipated for other rare earth elements such as ytterbium, erbium, lanthanum, and scandium.

In accord with the present invention, it has been found that significant improvements in the high temperature charge efficiency of rechargeable alkaline cells are obtained when specific, synergistic concentrations of cobalt in both the particulate and matrix portions of the positive electrode composition are maintained. The inventors hereof believe that optimum high temperature performance is achieved if the cobalt concentration of the matrix material of the electrode exceeds 6 weight percent and ranges up to, and including, 14 weight percent; and if the cobalt concentration of the nickel hydroxide particles exceeds 8 atomic percent and ranges up to, and including, 15 atomic percent. It has been found, as will be shown hereinbelow, that when cobalt is present in these ranges, the particulate and matrix components of the electrode composition interact synergistically to provide optimized high temperature performance.

In particular instances, the cobalt concentration of the matrix component is at least 8 weight percent and in particular instances it ranges from 9 to 12 weight percent. In a specific instance, the cobalt concentration of the matrix is approximately 11 weight percent. In particular instances, the cobalt concentration of the particles is at least 9 atomic percent and in one particular instance is in the range of 9 to 14 atomic percent. In one specific instance, the cobalt concentration of the particles is approximately 10 atomic percent and in another specific instance it is approximately 12 atomic percent.

The prior art has generally employed potassium hydroxide based electrolytes for electrochemical cells of the type disclosed herein. However, the inventors hereof have found that the high temperature performance of these types of cells is improved if the electrolyte is comprised mainly of sodium hydroxide together with a small amount of lithium hydroxide. A typical electrolyte composition of the present invention comprises NaOH:LiOH:DI water=14.8:1:47.4 by weight, and this electrolyte has a molarity of approximately 7.7-8. It has been found that cells which utilize this electrolyte manifest better high temperature performances than cells utilizing a potassium hydroxide:lithium hydroxide electrolyte.

In order to demonstrate the synergistic effects achieved through the use of the cobalt concentration ranges of the present invention, a number of rechargeable alkaline cells were prepared in accord with conventional techniques utilizing various positive electrode compositions. These cells were evaluated with regard to their high temperature performance. Specifically, all electrodes used in this evaluation were prepared by the wet paste method as discussed above and included a positive electrode material in which the levels of cobalt in both the matrix and the nickel hydroxide particles were varied. The electrodes were prepared utilizing a nickel foam support. The resultant positive electrodes were incorporated into a cell structure including a negative electrode based upon nickel metal hydride alloys. A body of separator material comprising a PP/PE based material with an acrylic acid layer for wetting as disposed between the positive and negative electrodes, and a sodium hydroxide based electrolyte as described above were incorporated into the cell structure.

Following assembly and electrochemical formation of the cells to determine initial cell capacity, each cell was then placed into an oven and allowed to equilibrate at a temperature of 55° C., 65° C., or 75° C. for 4 hours prior to evaluation. Each of the thus prepared cells was subjected to a series of charge/discharge cycles while being maintained at the selected elevated temperature. The charge/discharge cycles were as follows: cycle 1—charge at a rate of 0.05 C for 48 hours then discharge to 1.0 volt at a rate of 0.2 C; cycle 2—charge at a rate of 0.5 C for 24 hours then discharge to 1.0 volt at a rate of 0.2 C; and cycle 3—charge at a rate of 0.5 C for 24 hours then discharge to 1.0 volt at a rate of 0.2 C. Results of the evaluation are depicted in FIGS. 2-5.

FIG. 2 represents a control cell, typical of the prior art, in which the level of cobalt in the nickel hydroxide particles is approximately 8 atomic percent, and the level of cobalt in the paste matrix is 6 weight percent. FIG. 2 shows the percent of room temperature capacity manifested by the cell at 50° C., 65° C., and 75° C. under initial (noncycled) conditions and following each of the three charge/discharge cycles referred to above. As will be seen, charge efficiency decreases significantly as a function of increasing temperature.

FIG. 3 is a graph, generally similar to that of FIG. 2, showing performance characteristics of a cell in accord with the present invention, in which the cobalt concentration of the paste matrix component has been increased to 11 weight percent. In the FIG. 3 experimental series, the concentration of cobalt in the nickel hydroxide particles was maintained at 8 atomic percent. As will be seen, the high temperature charge efficiency of this cell, particularly with regard to the performance at 50° C., has been significantly increased, although performance of the cells at 65° C. and 75° C. has not been improved.

Figure 4:
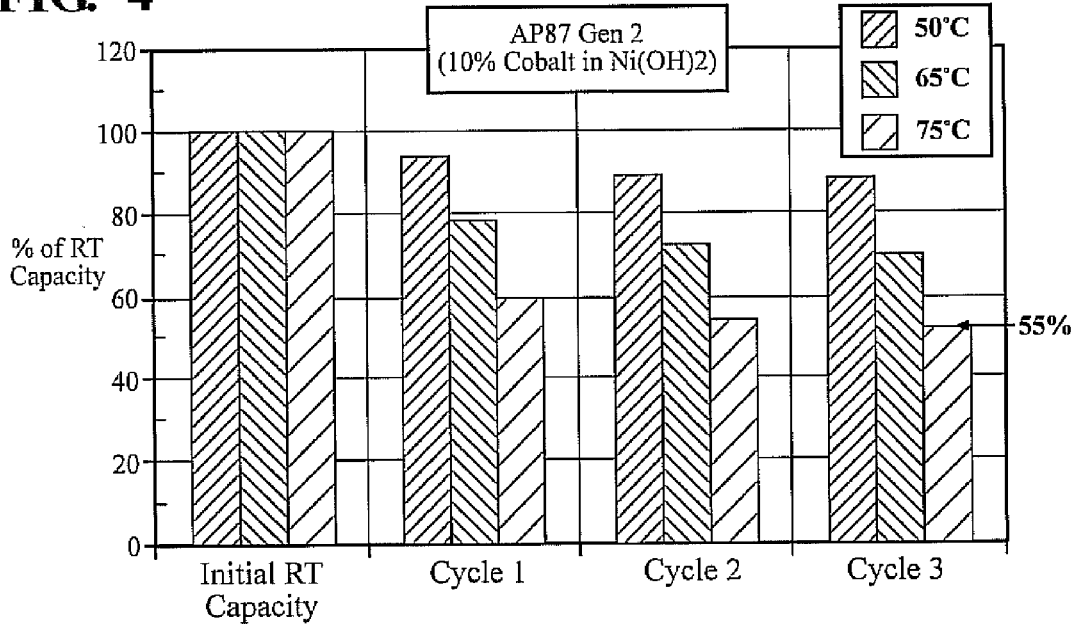
FIG. 4 is a graph depicting performance characteristics of another cell in accord with the present invention.

Referring now to FIG. 4, there is shown a graph generally similar to the foregoing graphs depicting the performance of a cell which is generally similar to that of FIG. 3 insofar as the cobalt concentration of the paste matrix component is 11 weight percent except that, further in accord with the present invention, the cobalt concentration in the nickel hydroxide particulate component of the positive electrode material has been increased to 10 atomic percent. As will be seen, the charge efficiency of this cell at elevated temperatures, and in particular at 65° C. and 75° C., has been significantly increased.

Figure 5:
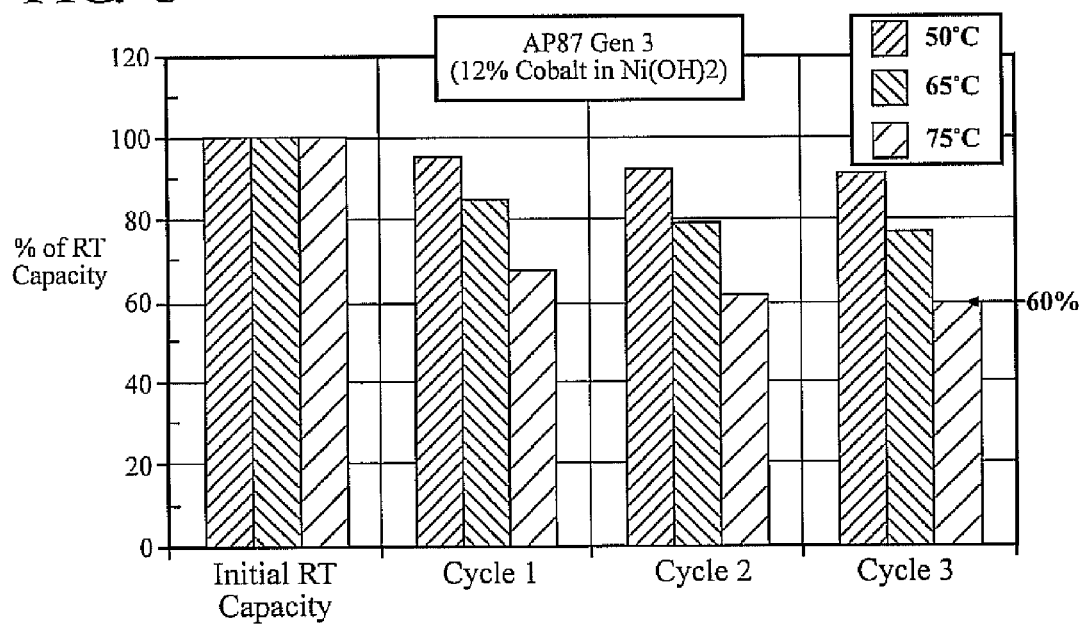
FIG. 5 is a graph depicting performance characteristics of yet another cell in accord with the present invention.

FIG. 5 shows the high temperature performance characteristics for a cell of the present invention in which the cobalt concentration of the paste matrix component is 11 weight percent and the concentration of cobalt in the nickel hydroxide particulate component is 12 percent. As will be seen, this cell manifests the best overall charge efficiency over the entire high temperature range of 50° C. to 75° C.

The foregoing data demonstrates that a synergistic interaction occurs, and significant improvements in the high temperature charge efficiency of NIMH cells is achieved when cobalt levels in both the paste component and the nickel hydroxide particulate component of the positive electrode composition are maintained within specific ranges. This finding is unexpected given that the prior art has not heretofore appreciated that the cobalt levels in both the matrix and particulate components play significant and interactive roles in optimizing the high temperature charge efficiency of rechargeable cells.

While not wishing to be bound by speculation, Applicants believe that the improvements in the high temperature efficiency achieved by the present invention may be due, at least in part, to the role of cobalt in the particle component of the electrode composition. Applicants have noted that as the cobalt concentration in the nickel hydroxide particles increases, the size of the microcrystallites comprising the particles decreases, even though the absolute size of the particles remains substantially constant; and as shown with regard to FIGS. 2-5 above, this increase in the cobalt concentration of the particles correlates with improved high temperature efficiency.

Figure 6:
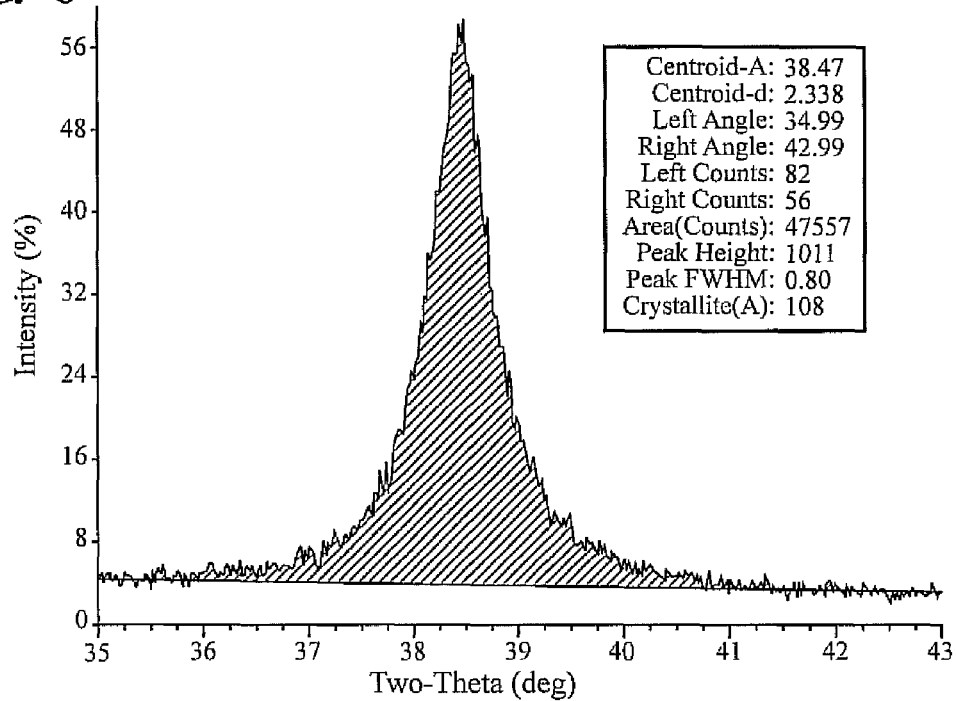
FIG. 6 shows X-Ray diffraction data for the nickel hydroxide particulate material used in the preparation of the electrode composition employed in the cells of FIGS. 2 and 3.

X-Ray diffraction (XRD) is a recognized method in the art for determining the crystallite size of materials. FIG. 6 shows XRD data for a sample of a nickel hydroxide material which includes 8 atomic percent cobalt. This particulate material was utilized in the preparation of the electrode compositions which were employed in the generation of the data summarized in FIGS. 2 and 3. As evidenced by the FIG. 6 data, the size of the microcrystallites comprising the 8% cobalt-containing nickel hydroxide particles is 108 Angstroms based on the reflection peak from the <101> plane.

Figure 7:
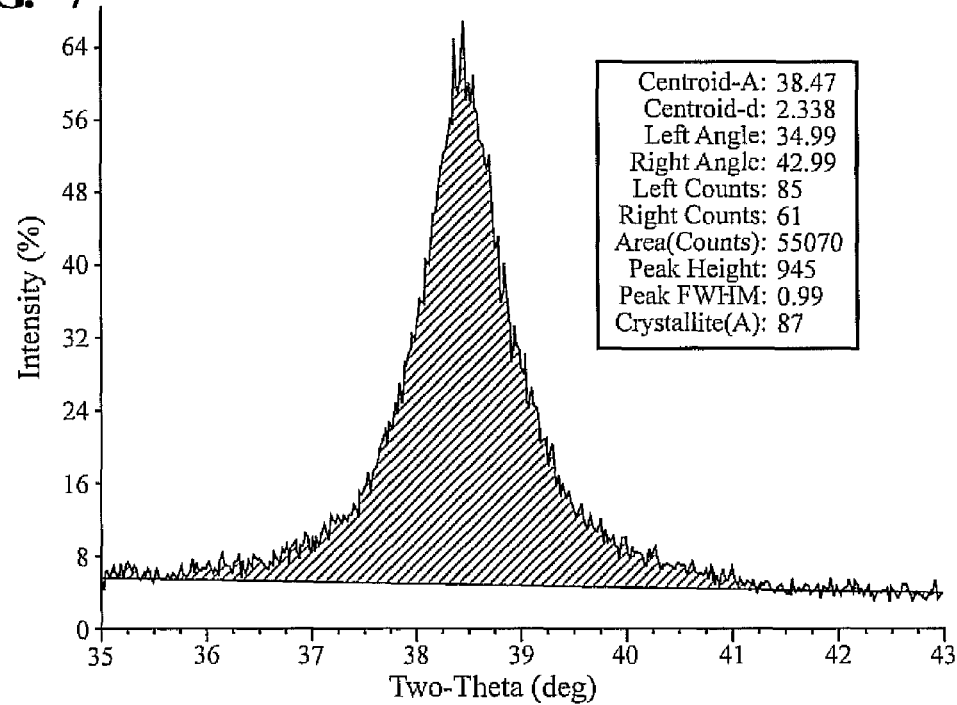
FIG. 7 shows X-Ray diffraction data for the nickel hydroxide particulate material used in the preparation of the electrode composition employed in the cell of FIG. 5.

FIG. 7 shows XRD data for a nickel hydroxide particulate material containing 12 atomic percent cobalt. This particulate material was utilized in the preparation of the electrode composition employed in the generation of the data summarized in FIG. 5. As evidenced by the FIG. 7 data, the size of the microcrystallites comprising the 12% cobalt-containing nickel hydroxide particles is 87 Angstroms based on the reflection peak from the <101> plane. As demonstrated above, the battery cell of FIG. 5 manifests the best high temperature charge efficiency. This improvement may, at least in part, be correlated with the decreased crystallite size of the material comprising the nickel hydroxide particles.

In particular, Applicants have thus found that in rechargeable, alkaline electrochemical cells of the type which include a positive electrode material comprised of nickel hydroxide particles disposed in a paste matrix, a synergistic effect occurs wherein the high temperature charge efficiency of those cells is significantly improved when the paste matrix component includes cobalt in an amount greater than 6 weight percent ranging upward to 14 weight percent and when the particles of nickel hydroxide include cobalt in an amount greater than 8 atomic percent ranging up to approximately 15 atomic percent. As previously noted, the inclusion of yttrium or other rare earths into the positive electrode composition as a component of the matrix will further enhance the high temperature charge efficiency of a battery cell. And, these improvements may also be a result of utilizing a composition which includes nickel hydroxide particles comprised of microcrystallites having a size of less than 100 Angstroms based on the reflection peak from the <101> plane.

While the foregoing discussion and description primarily concern battery systems of the nickel metal hydride type wherein the negative electrode of the cell is composed of a nickel metal hydride material, the principles of this invention may also be employed in connection with other nickel containing battery systems.

In view of the teaching presented herein, such other embodiments and modifications of the invention will be apparent to those of skill in the art. The foregoing is illustrative of the invention and is not meant to be a limitation upon the practice thereof. It is the following claims, including all equivalents, which define the scope of the invention.

The invention claimed is:

1. A positive electrode composition for use in an alkaline, rechargeable electrochemical cell, said composition comprising:
   a matrix material comprising a mixture of nickel hydroxide and a cobalt material comprising cobalt metal and/or a cobalt oxide, wherein the weight percent of cobalt in said mixture relative to the nickel component thereof is greater than 6% and less than or equal to 14%; and
   particles of nickel hydroxide dispersed in said matrix, said nickel hydroxide particles being doped in their bulk with cobalt, the atomic percent of said cobalt being greater than 8% and less than or equal to 12%.

2. The electrode composition of claim 1, wherein the weight percent of cobalt in said matrix is in the range of 8% to 12%.

3. The electrode composition of claim 1, wherein said matrix includes a binder.

4. The electrode composition of claim 1, wherein said matrix comprises a paste.

5. The electrode composition of claim 1, wherein said particles of nickel hydroxide are comprised of a plurality of microcrystallites having a particle size of less than 100 Angstroms based on the reflection peak from the <101> plane.

6. The electrode composition of claim 5, wherein said microcrystallites have a particle size of less than 90 Angstroms based on the reflection peak from the <101> plane.

7. A positive electrode for use in an alkaline, rechargeable electrochemical cell, said electrode comprising a substrate having the electrode composition of claim 1 supported thereupon.

8. An alkaline, rechargeable electrochemical cell including the electrode of claim 7.

9. A method of making an electrode for a rechargeable alkaline electrochemical cell, said method comprising the steps of:
   providing a matrix material comprising a mixture of nickel hydroxide and a cobalt material, said cobalt material comprising cobalt and/or cobalt oxide, wherein the weight percent of cobalt in said mixture, relative to the nickel hydroxide component in said mixture, is greater than 6% percent and less than or equal to 14%;
   providing particles of nickel hydroxide, said particles including a cobalt dopant wherein the atomic percent of said cobalt dopant is greater than 8% and less than or equal to 12%;
   disposing said particles in said matrix so as to form an electrode composition;
   providing a substrate; and
   disposing said electrode composition on said substrate.

10. The method of claim 9, wherein said matrix material comprises a paste and further includes a binder.

11. The method of claim 9, wherein said matrix comprises a dry material.

12. The method of claim 9, wherein said substrate is a foamed nickel substrate and wherein said electrode composition is at least partially disposed within the pores of said foam.

13. The method of claim 9, including the further step of contacting said electrode with an electrolyte which comprises an aqueous solution of an alkali metal hydroxide.

14. The method of claim 13, wherein the majority of the alkali metal hydroxide in said electrolyte is sodium hydroxide.

15. The method of claim 9, wherein the particles of nickel hydroxide comprise 8-12 atomic percent of cobalt in the matrix material.

16. The method of claim 15, wherein said particles of nickel hydroxide are comprise of a plurality of microcrystallites having a particle size of less than 100 Angstroms based on the reflection peak from the <101> plane.

17. The method of claim 7, wherein the particles of nickel hydroxide are substantially spherical and have an average diameter in the range of 5-20 microns.

18. A positive electrode composition for use in an alkaline, rechargeable electrochemical cell, said composition comprising:

a matrix material comprising a mixture of nickel hydroxide, a cobalt material comprising cobalt metal and/or a cobalt oxide, wherein the weight percent of cobalt in said mixture relative to the nickel component thereof is greater than 6% and less than or equal to 14%; and a rare earth material; and particles of nickel hydroxide doped in their bulk with cobalt dispersed in said matrix, the atomic percent of said cobalt being greater than 8% and less than or equal to 12%.

19. The positive electrode composition of claim 18, wherein said rare earth material comprises yttrium and/or yttrium oxide.

20. The positive electrode composition of claim 19, wherein the amount of yttrium in said rare earth material is in the range of 0.5 to 5 weight percent.

21. The positive electrode composition of claim 19, wherein the amount of yttrium in said rare earth material is in the range of 0.5 to 2 weight percent.

\* \* \* \* \*